United States Patent [19]

Binder et al.

[11] 4,368,311

[45] Jan. 11, 1983

[54] ACCELERATOR FOR HARDENING UNSATURATED RESINS

[75] Inventors: Klaus Binder, Munich; Wolfgang Edl, Grosshesselohe; Hansjoachim Twittenhoff, Strasslach, all of Fed. Rep. of Germany

[73] Assignee: Peroxid-Chemie GmbH, Hoellriegelskreuth, Fed. Rep. of Germany

[21] Appl. No.: 252,716

[22] Filed: Apr. 10, 1981

[30] Foreign Application Priority Data

Apr. 25, 1980 [DE] Fed. Rep. of Germany ....... 3016051

[51] Int. Cl.$^3$ .......................... C08F 4/00; C08F 4/10; C08F 4/26; C08J 3/24
[52] U.S. Cl. .................................. 526/317; 106/264; 106/310; 252/182; 526/328; 528/272; 528/306
[58] Field of Search ................ 106/264, 310; 260/22 CA; 525/14, 17, 21; 252/182; 528/272, 306; 526/317, 328

[56] References Cited

U.S. PATENT DOCUMENTS

| | | | |
|---|---|---|---|
| 2,390,830 | 12/1945 | Elliott | 106/310 |
| 3,449,276 | 6/1969 | Rabenold et al. | 260/22 CA |
| 3,956,211 | 5/1976 | Muto et al. | 525/49 |
| 3,983,185 | 9/1976 | Dorfman et al. | 525/14 |
| 4,001,348 | 1/1977 | Selbeck et al. | 525/14 |
| 4,042,646 | 8/1977 | Edamura et al. | 525/49 |
| 4,195,014 | 3/1980 | Dorfman et al. | 525/14 |

FOREIGN PATENT DOCUMENTS

| | | | |
|---|---|---|---|
| 1252414 | 10/1967 | Fed. Rep. of Germany | 525/17 |
| 45-7871 | 3/1970 | Japan | 525/21 |

OTHER PUBLICATIONS

Chemical Abstracts, vol. 84, No. 2, Jan. 12, 1976, Item 84:5959p.

*Primary Examiner*—Ronald W. Griffin
*Attorney, Agent, or Firm*—Felfe & Lynch

[57] ABSTRACT

The present invention provides an accelerator for hardening unsaturated resins, comprising a mixture of at least one ketimine and at least one inorganic or organic cupric or ferric compound.

The present invention also provides a process for hardening unsaturated resins, wherein an accelerator is used comprising at least one ketimine and at least one inorganic or organic cupric or ferric compound, together with a conventional hardener.

21 Claims, No Drawings

ACCELERATOR FOR HARDENING UNSATURATED RESINS

This invention relates to an accelerating composition for hardening unsaturated resins and methods of hardening using such accelerating composition.

It is known to harden unsaturated polyesters by using an alpha,beta-unsaturated beta-aminoketone as an accelerator in combination with a peroxide which contains a hydroperoxide group, viz., hydrogen peroxide, from Federal Republic of Germany Pat. No. 2,538,013. This patent mentions that a third reagent, such as a metal salt, and especially a cobalt salt, can be used as accelerator. In the case of resins which cannot be hardened easily, this accelerator system can only be used together with hydrogen peroxide, whereas together with organic peroxides, it cannot be used for these resins.

From Federal Republic of Germany Pat. No. 2,337,332, it is known to use certain chelate compounds of transition metals, for example bis-(N-phenyl-salicylideneiminato)-cobalt or bis-(N-tert.-butyl-salicylideneiminato)-copper as hardening accelerators for unsaturated polyester and alkyd resin masses.

Finally, Federal Republic of Germany Pat. No. 2,407,713 discloses the use of acetoacetic acid amides of cyclic amines in unsaturated polyester resin moulding and coating masses. These acetoacetic acid ester amides can be used in combination with accelerators, such as cobalt salts, for example cobalt octoate and cobalt naphthenate.

These previously known processes in which organic cobalt salts are used as accelerators suffer from the disadvantage that they discolor the hardened resins. Furthermore, accelerator solutions containing cobalt salts, for example the accelerator solutions described in Federal Republic of Germany Pat. No. 2,538,013, display a tendency for the cobalt salts to precipitate so that they do not possess the necessary storage stability.

It is an object of the present invention to provide an accelerator or an accelerator system for hardening unsaturated resins and especially unsaturated resins which cannot be hardened easily which possesses the necessary storage stability and, without discoloration of the hardened resins, leads to a rapid and complete hardening of the resins, use being made of conventional organic peroxide hardeners.

Surprisingly, we have now found that this problem can be solved with the help of an accelerator which is a mixture of a ketimine and of an inorganic or organic cupric or ferric compound and optionally of an organic solvent.

Thus, according to the present invention, there is provided an accelerator for hardening unsaturated resins, comprising a mixture of at least one ketimine and at least one inorganic or organic cupric or ferric compound.

The accelerator according to the present invention can be used for hardening unsaturated resins and especially unsaturated resins which are difficult to harden, and are based upon o-phthalic acid or isophthalic acid, resins of the bisphenol-A type and the neopentylglycol type and vinyl ester resins and acrylic resins.

When the accelerator according to the present invention contains an organic cupric or ferric compound, this is preferably a salt of these elements with an organic fatty acid containing 6 to 22 carbon atoms or with a naphthenic acid. Amongst the organic and inorganic salts, cupric acetate, cupric naphthenate, ferric chloride and ferric octoate are especially preferred. These salts lead to a quicker and complete hardening of the above-mentioned unsaturated resins and, especially in the case of copper, lead to a surprisingly low degree of discoloration, very light-stable products also being obtained which, in the case of subsequent weathering, do not display any noticeable further change of color, which is pale yellow. For resins which possess a stronger inherent color, such as polyester resins based on isophthalic acid, the bisphenol-A resins, the neopentylglycol resins and vinyl ester resins, the use of ferric compounds is also possible (besides cupric compounds) which tend to give rise to a certain degree of discoloration.

Besides these cupric or ferric compounds, the accelerator according to the present invention contains a ketimine. Ketimines are preferred of the following general formula, which only gives one of the possible tautomeric forms thereof:

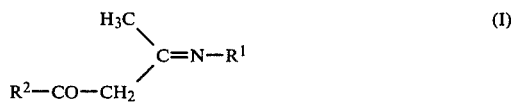

wherein $R^1$ is a hydrogen atom, a straight-chain or branched alkyl or aralkyl radical containing up to 10 carbon atoms or a cycloalkyl radical containing 3 to 8 carbon atoms, preferably an n-propyl, isopropyl, n-pentyl, isopentyl, n-decyl or a cyclohexyl radical, and $R^2$ is an alkyl or alkoxy radical containing up to 4 carbon atoms or an aryl or aryloxy radical, preferably a methyl or ethoxy radical.

The ketimines may be obtained by reacting a primary alkylamine, aralkylamine, cycloalkylamine or ammonia with a β-diketone and preferably by reacting a primary amine of the general formula:

wherein $R^1$ has the same meaning as above, with a compound of the general formula:

in which $R^2$ has the same meaning as above. Stoichiometric amounts may be used, i.e. 1 mole of amine is reacted with 1 mole of β-diketone. Preferably, however, a slight excess of one or other of the reaction components is used.

The exothermal reaction proceeds readily to give the desired ketimine. Instead of a separately prepared ketimine, the accelerator according to the present invention can also contain a ketimine formed in situ from a mixture of the starting components, i.e. amine and β-diketone.

According to the preferred embodiment of the present invention, the accelerator contains an organic solvent which is compatible with the resin to be hardened and in which the ketimine and the cupric or ferric salt used are soluble. This organic solvent can be, for example, an alcohol, such as isopropyl alcohol, or an aromatic hydrocarbon, such as toluene or xylene.

It has proved to be advantageous when the accelerator, optionally containing a solvent, contains the cupric or ferric compound in an amount of from 0.1 to 1% by weight, preferably of about 0.4 by weight, calculated as metal, and referred to the accelerator inclusive of the solvent, when present.

The accelerator of the present invention is prepared simply by mixing the components. As mentioned above, instead of the separately prepared ketimine, a mixture of amine and β-diketone may also be used.

Furthermore, the present invention provides a process for hardening the above-mentioned unsaturated resins, wherein the accelerator according to the present invention is used in combination with a conventional hardener preferably an organic peroxide, such as ketone peroxide, hydroperoxide and/or perester. Especially preferred products of this kind include methyl ethyl ketone peroxide, methyl isobutyl ketone peroxide, acetylacetone peroxide, cyclohexanone peroxide, tert.-butyl hydroperoxide, cumol hydroperoxide, tert.-butyl per-2-ethylhexanoate and/or tert.-butyl perbenzoate. The accelerator according to the present invention is preferably used in an amount which gives 0.001 to 0.02% by weight of metal and 0.005 to 0.5% by weight of ketimine, in each case referred to the resin. Especially preferably, use is made of from 0.2 to 2% by weight of accelerator.

These organic peroxides are used in amounts of from 0.5 to 3% by weight, referred to the unsaturated resin to be hardened.

The compound of general formula (II) is preferably a primary aliphatic or cycloaliphatic amine containing 3 to 8 carbon atoms and especially n-propylamine, isopropylamine, n-pentylamine, isopentylamine or n-decylamine, and more especially cyclohexylamine.

The preferred reaction components of the above-given general formula (III) include acetylacetone and acetoacetic acid esters.

The following Examples are given for the purpose of illustrating the present invention. The parameters of gel time, hardening time and temperature given in the Examples of hardening were, in all cases, determined according to Federal Republic of Germany Industrial Standard No. DIN 16945. Insofar as deviations were made therefrom, this is clearly stated, for example with regard to the bulk hardening at 23° C.

EXAMPLES OF PREPARATION

These examples illustrate the preparation of the ketimines used in the accelerator according to the present invention and having general formula I.

1.0. Acetylacetone cyclohexylimine 0.1 Mole acetylacetone is mixed with 0.1 mole cyclohexylamine. After the exothermal reaction has subsided, the desired compound is obtained.

1.1 Acetylacetone n-propylimine 0.1 Mole (5.9 g.) n-propylamine is mixed with 0.1 mole (10 g.) acetylacetone. An exothermal reaction takes place in which a yellowish, liquid ketimine is obtained which, even after comparatively lengthy storage, does not give a precipitate.

1.2 Acetylacetone isopropylimine 0.1 Mole (5.9 g.) isopropylamine is mixed with 0.1 mole (10 g.) acetylacetone. An exothermal reaction takes place in which a yellowish, crystalline ketimine is obtained which, after one day, slowly melts and then remains liquid.

1.3 Acetylacetone n-pentylimine 0.1 Mole (8.7 g.) n-pentylamine is mixed with 0.1 mole (10 g.) acetylacetone. An exothermal reaction takes place in which a yellowish, liquid but cloudy ketimine is obtained which clarifies after 24 hours but is present in two phases.

1.4 Acetylacetone isopentylimine 0.1 Mole (8.7 g.) isopentylamine is mixed with 0.1 mole (10 g.) acetylacetone. An exothermal reaction takes place in which a yellowish, liquid, very cloudy ketimine is obtained which, however, becomes clear after 24 hours and is present in two phases.

1.5 Acetylacetone n-decylimine 0.1 Mole (15.7 g.) n-decylamine is mixed with 0.1 mole (10 g.) acetylacetone. An exothermal reaction takes place in which a yellowish, liquid ketimine is obtained which contains a considerable amount of precipitate which, even after comparatively lengthy storage, remains in this state.

1.6 Ethyl acetoacetate cyclohexylimine 0.1 Mole (13.0 g.) ethyl acetoacetate is mixed with 0.1 mole (9.9 g.) cyclohexylamine. An exothermal reaction takes place in which a yellowish, clear reaction product is obtained, which is free of precipitate and shows no change even after comparatively long storage.

EXAMPLE 1

Copper-ketimine accelerator (ACU 1)

10 Parts by weight of the ketimine prepared by reacting 1 mole acetylacetone with 1 mole cyclohexylamine (acetylacetone cyclohexylamine according to Preparation Example 1.0) are mixed with 2 parts by weight of copper naphthenate (10% copper) and 88 parts by weight isopropyl alcohol. 100 parts by weight of a greenish colored, low viscosity liquid are obtained with a copper content of 0.2% by weight (calculated as metal) which may be used for hardening normal polyester resins.

Instead of the ketimine, a mixture of the starting components therefor can also be added directly with the solvent and the copper compound.

EXAMPLE 2

Copper-ketimine accelerator (ACU 3)

30 Parts by weight of the ketimine used in Example 1 are mixed with 2 parts by weight copper naphthenate (10% copper) and 68 parts by weight isopropyl alcohol to give 100 parts by weight of a greenish, average viscosity liquid with a copper content of 0.2% by weight (calculated as metal), which may be used for hardening vinyl ester resins.

EXAMPLE 3

Iron-ketimine accelerator (AFE 1)

10 Parts by weight of the ketimine used in Example 1 are mixed with 3.33 parts by weight of iron octoate (6% iron) and 86.67 parts by weight isopropyl alcohol to give 100 parts by weight of a reddish, low viscosity liquid with an iron content of 0.2% (referred to the metal), which may be used for hardening normal polyester resins.

EXAMPLE 4

Iron-ketimine accelerator (AFE 3)

30.0 Parts by weight of the ketimine used in Example 1 are mixed with 3.33 parts by weight iron octoate (6% iron) and 66.67 parts by weight isopropyl alcohol to give 100 parts by weight of a reddish, average viscosity liquid with an iron content of 0.2% by weight (calculated as metal).

EXAMPLES 5 to 10

Using the procedure according to one of Examples 1 to 4, by mixing 2 g. copper naphthenate with 10 g. of the ketimines described in Preparation Examples 1.1 to 1.5 and 88 g. isopropyl alcohol, accelerators ACU 1 (1.1), ACU 1 (1.2), ACU 1 (1.3), ACU 1 (1.4), ACU 1 (1.5) and ACU 3 (Ac ester 1.6) are obtained.

EXAMPLE 11 (COMPARISON)

(a) An accelerator is prepared by mixing 2.0 g. cobalt octoate or cobalt naphthenate with 10 g. of the ketimine used in Example 1 (acetylacetone cyclohexylimine) and 88 g. isopropyl alcohol. A cloudy mixture is obtained from which the cobalt salts have precipitated.

(b) 2.0 g. Cobalt octoate or cobalt naphthenate are mixed with 30.0 g. of the ketimine used in Example 1 (acetylacetone cyclohexylimine) and 68 g. isopropyl alcohol. A cloudy mixture is obtained from which the cobalt salts precipitate. Thus, these accelerator mixtures are unsuitable and also cannot be tested for their activity because they cannot be pipetted.

EXAMPLE 12

Investigation of the accelerator properties (1) Storage stability

After a storage time of 4 months, the accelerators according to the present invention did not show any drift of activity or precipitation. The accelerators were thereby repeatedly investigated with regard to their activity for the hardening of unsaturated polyester resins. In each case, 1 part by weight of the accelerator was mixed with 100 parts by weight of the unsaturated polyester resin to be investigated and 2 parts by weight of an organic peroxide.

(2) Investigation of the hardening

The following hardeners were used for the investigation of the hardening:

ketone peroxide:
    methyl ethyl ketone peroxide, methyl isobutyl ketone peroxide, aceylacetone peroxide and cyclohexanone peroxide hydroperoxides:
    tert.-butyl hydroperoxide and cumol hydroperoxide per esters:
    tert.-butyl per-2-ethyl hexanoate and tert.-butyl perbenzoate For investigating the hardening cold hardening at 23° C. was investigated in 50 g. blocks. For this investigation, temperature-time diagrams were prepared, which are summarized in the following Tables I to III. In these Tables and in the subsequent Tables, the abbreviations used have the following meanings:

resin type A
    unsaturated polyester resin based on orthophthalic acid
resin type B
    unsaturated polyester resin based on isophthalic acid
resin type C
    bisphenol-A resin
resin type D
    neopentylglycol resin
resin type E
    vinyl ester resin
resin type F
    acrylic resin
MEKP-NA.1
    methyl ethyl ketone peroxide, normal activity solution
AAP-NA.1
    acetylacetone peroxide, normal activity solution
MIKP-NA.1
    methyl isobutyl ketone peroxide, normal activity solution
CHP-NA.1
    cyclohexanone peroxide, normal activity solution
CIHP-80
    cumol hydroperoxide, 80% liquid
TBHP-80
    tert.-butyl hydroperoxide, 80% liquid
TBPEH
    tert.-butyl per-2-ethylhexanoate
TBPB
    tert.-butyl perbenzoate
MIKP-NA-M 1
    methyl isobutyl ketone peroxide
TC 510
    tert.-butyl catechol, inhibitor
ACU 1
    accelerator of Example 1
ACU 3
    accelerator of Example 2
AFE 1
    accelerator of Example 3
AFE 3
    accelerator of Example 4
ACU 1 (1.1)
    accelerator of Example 5
ACU 1 (1.2)
    accelerator of Example 6
ACU 1 (1.3)
    accelerator of Example 7
ACU 1 (1.4)
    accelerator of Example 8
ACU (1.5)
    accelerator of Example 9
Acac
    acetylacetone
Ac ester
    ethyl acetoacetate
COB 1
    accelerator of Example 10
DTBP
    di-tert.-butyl peroxide
BP-50.+FT
    dibenzoyl peroxide 50% powder with phthalate
BU-HA-M1
    2,2-bis-(tert.-butylperoxy)-butane

TABLE I

| resin type A (parts by wt.) | 100 | 100 | 100 | 100 | 100 | 100 | 100 | 100 | 100 | 100 | 100 | 100 | 100 | 100 | 100 | 100 |

TABLE I-continued

| | | | | | | | | | | | | | | | | |
|---|---|---|---|---|---|---|---|---|---|---|---|---|---|---|---|---|
| MEKP-NA-1 (parts by wt.) | 2 | 2 | — | — | — | — | — | — | — | — | — | — | — | — | — | — |
| AAP-NA-1 (parts by wt.) | — | — | 2 | 2 | — | — | — | — | — | — | — | — | — | — | — | — |
| MIKP-NA-1 (parts by wt.) | — | — | — | — | 2 | 2 | — | — | — | — | — | — | — | — | — | — |
| CHP-NA-1 (parts by wt.) | — | — | — | — | — | — | 2 | 2 | — | — | — | — | — | — | — | — |
| CUHP-80 (parts by wt.) | — | — | — | — | — | — | — | — | 2 | 2 | — | — | — | — | — | — |
| TBHP-80 (parts by wt.) | — | — | — | — | — | — | — | — | — | — | 2 | 2 | — | — | — | — |
| TBPEH (parts by wt.) | — | — | — | — | — | — | — | — | — | — | — | — | 2 | 2 | — | — |
| TBPB (parts by wt.) | — | — | — | — | — | — | — | — | — | — | — | — | — | — | 2 | 2 |
| ACU 1 (parts by wt.) | 1 | — | 1 | — | 1 | — | 1 | — | 1 | — | 1 | — | 1 | — | 1 | — |
| AFE 1 (parts by wt.) | — | 1 | — | 1 | — | 1 | — | 1 | — | 1 | — | 1 | — | 1 | — | 1 |
| gel time min. (parts by wt.) | 3.7 | 7.0 | 17 | 14 | 3.5 | 3.5 | 4.0 | 3.6 | 120 | 120 | gelling only | gelling only | hardens o-vernight | hardens o-vernight | hardens o-vernight | hardens o-vernight |
| hardening time min. (parts by wt.) | 5.8 | 19 | 26 | 34 | 5.8 | 6.5 | 7.8 | 8.8 | 160 | 170 | | | | | | |
| temp. peak[1] (parts by wt.) | 205 | 195 | 196 | 187 | 202 | 196 | 210 | 195 | 191 | 176 | | | | | | |

[1] temperature maximum in °C.

TABLE II

| | | | | | | |
|---|---|---|---|---|---|---|
| resin type A (parts by wt.) | 100 | 100 | 100 | 100 | 100 | 100 |
| ACU 1 (1.1) (parts by wt.) | 1 | — | — | — | — | — |
| ACU 1 (1.2) (parts by wt.) | — | 1 | — | — | — | — |
| ACU 1 (1.3) (parts by wt.) | — | — | 1 | — | — | — |
| ACU 1 (1.4) (parts by wt.) | — | — | — | 1 | — | — |
| ACU 1 (1.5) (parts by wt.) | — | — | — | — | 1 | — |
| ACU 1 (parts by wt.) | — | — | — | — | — | 1 |
| MEKP.HA 1 (parts by wt.) | 2 | 2 | 2 | 2 | 2 | 2 |
| gel time (parts by wt.) | 5.2 | 5.2 | 5.2 | 5.2 | 5.2 | 5.2 |
| hardening time (parts by wt.) | 8.1 | 9.0 | 8.3 | 8.2 | 9.0 | 8.1 |
| temp. peak (parts by wt.) | 202 | 210 | 208 | 208 | 207 | 206 |

TABLE III

| | | | | | | | | | | | | |
|---|---|---|---|---|---|---|---|---|---|---|---|---|
| resin type A (parts by wt.) | 100 | 100 | — | — | — | — | — | — | — | — | — | — |
| resin type B (parts by wt.) | — | — | 100 | 100 | — | — | — | — | — | — | — | — |
| resin type C (parts by wt.) | — | — | — | — | 100 | 100 | — | — | — | — | — | — |
| resin type D (parts by wt.) | — | — | — | — | — | — | 100 | 100 | — | — | — | — |
| resin type E (parts by wt.) | — | — | — | — | — | — | — | — | 100 | 100 | — | — |
| resin type F (parts by wt.) | — | — | — | — | — | — | — | — | — | — | 100 | 100 |
| ACU 1 (parts by wt.) | 1 | — | 1 | — | 1 | — | 1 | — | 1 | — | — | — |
| ACU 3 (parts by wt.) | — | — | — | — | — | — | — | — | — | 1 | — | — |
| AFE 1 (parts by wt.) | — | 1 | — | 1 | — | 1 | — | 1 | — | 1 | — | — |
| AFE 3 (parts by wt.) | — | — | — | — | — | — | — | — | — | — | — | 1 |
| MIKP-NA-M1 (parts by wt.) | 2 | 2 | 2 | 2 | 2 | 2 | 2 | 2 | 2 | 2 | 2 | 2 |
| gel time (parts by wt.) | 3.7 | 7.0 | 20 | 13 | 26 | 40 | 5 | 4 | 15 | 15 | 8 | 6 |
| hardening time (parts by wt.) | 5.8 | 19 | 28 | 26 | 37 | 75 | 8.5 | 10 | 27 | 84 | 19 | 32 |
| temp. peak (parts by wt.) | 205 | 195 | 207 | 203 | 200 | 35 | 140 | 135 | 190 | 62 | 160 | 134 |

TABLE IV

| | | | | |
|---|---|---|---|---|
| resin type A (parts by wt.) | 100 | 100 | — | — |
| resin type E (parts by wt.) | — | — | 100 | 100 |
| ACU 3 (Acac)[2] (parts by wt.) | 0.5 | — | 1 | — |
| ACU 3 (Ac—ester)[3] (parts by wt.) | — | 0.5 | — | 1 |
| MIKP-NA-M1 (parts by wt.) | 2 | 2 | 2 | 2 |
| gel time | 10.5 | 4.6 | 22 | 5 |
| hardening time | 14.5 | 7.2 | 31 | 15 |
| temp. peak | 214 | 205 | 190 | 193 |

[2] prepared with acetylacetone
[3] prepared with ethyl acetoacetate

From the above Tables I to IV, it can be seen that the iron-ketimine accelerators according to the present invention are practically just as effective as those derived from copper.

Only a light yellow coloration of the cold-hardened resins was observed. In the case of the strongly inherently colored resin types B, C, D and E, no discoloration due to the accelerators was ascertained. If the cold-hardened parts are subjected to an artificial rapid weathering, then only a minimal yellowish discoloration occurs.

Purified, definite filling materials do not have any influence on the course of the cold hardening. In the case of naturally-occurring filling materials, a pretesting must be carried out.

(3) Degree of hardening

Measurements took place on laminates (with glass mats impregnated with the resin batches). The degree of hardening was determined on the basis of the residual styrene content, which was determined gas chromatographically, and of the dielectric loss factor (tg$\Delta$). The laminate thickness was uniformly 2 mm.

Furthermore, the determinations of the degree of hardening were repeated after post-hardening at an elevated temperature. For this purpose, the laminates were heated for 4 hours at 100° C.

The results hereby obtained are summarised in the following Tables V and VI.

TABLE V

| | | | | | | | | | | | | |
|---|---|---|---|---|---|---|---|---|---|---|---|---|
| resin type A | 100 | 100 | 100 | 100 | 100 | 100 | 100 | 100 | 100 | 100 | — | — |
| resin type E | — | — | — | — | — | — | — | — | — | — | 100 | 100 |
| MEKP-NA-1 | 2 | 2 | — | — | — | — | — | — | — | — | — | — |
| MIKP-NA-M1 | — | — | 2 | 2 | — | — | — | — | — | — | 2 | 2 |
| AAP-NA-1 | — | — | — | — | 2 | 2 | — | — | — | — | — | — |
| CUHP-80 | — | — | — | — | — | — | 2 | 2 | — | — | — | — |
| TBPEH | — | — | — | — | — | — | — | — | 2 | 2 | — | — |
| ACU 1 | 1 | — | 1 | — | 1 | — | 1 | — | 1 | — | — | — |
| ACU 3 | — | — | — | — | — | — | — | — | — | — | 1 | — |
| AFE 1 | — | 1 | — | 1 | — | 1 | — | 1 | — | 1 | — | — |

TABLE V-continued

| | | | | | | | | | | | | | |
|---|---|---|---|---|---|---|---|---|---|---|---|---|---|
| AFE 3 | — | — | — | — | — | — | — | — | — | — | — | — | 1 |
| beaker hardening at 23° C., 50 g. | | | | | | | | | | | | | |
| gel time | 4.5 | 7.0 | 13 | 12 | 17 | 14 | 120 | 120 | >8$^h$ | >8$^h$ | | 13 | 15 |
| hardening time | 8.5 | 19 | 18 | 20 | 26 | 34 | 160 | 170 | <16$^h$ | <16$^h$ | | 31 | 84 |
| temp. peak | 207 | 187 | 202 | 204 | 196 | 187 | 191 | 176 | — | — | | 188 | 62 |
| laminate hardening 2 mm. at ambient temperature | | | | | | | | | | | | | |
| "mould release" time* | 12' | 240' | 28' | 42' | 43' | 120' | 240' | 210' | 8–16$^h$ | 8–16$^h$ | | 45' | 10$^h$ |
| tg δ without heating | 32 | 34 | 21 | 21 | 18 | 33 | 19 | 25 | 32 | 35 | | 1.3 | 8.0 × 10$^{-3}$ |
| residual styrene content % without heating | 1.8 | 1.9 | 0.8 | 1.4 | 1.6 | 2.5 | 1.0 | 1.4 | 2.0 | 3.8 | | 4.2 | 9.8 |
| tg δ 4 h., 100° C. | 2.5 | 3.4 | 1.8 | 1.9 | 2.5 | 2.0 | 1.9 | 1.7 | 1.8 | 1.0 | | 0.2 | 0.2 × 10$^{-3}$ |
| residual styrene content % 4 h., 100° C. | 0.0 | 0.3 | 0.0 | 0.0 | 0.01 | 0.06 | 0.0 | 0.0 | 0.0 | 0.04 | | 0.01 | 1.6 |

*"demould" time means reaching a surface hardness of the laminate of Shore D70 (arbitrary but close to practical) from commencement of the mixing.

TABLE VI

Influence of the accelerator in the case of hot hardening in the middle temperature range (the hardening took place at 80° C. in a test tube).

| | | | | | | | | | | | | | | | |
|---|---|---|---|---|---|---|---|---|---|---|---|---|---|---|---|
| resin type A | 100 | 100 | 100 | 100 | 100 | 100 | 100 | 100 | 100 | 100 | 100 | 100 | 100 | 100 | 100 |
| TBPB | 1 | 1 | 1 | — | — | — | — | — | — | — | — | — | — | — | — |
| BU-HA-MI | — | — | — | 2 | 2 | 2 | — | — | — | — | — | — | — | — | — |
| DTBP | — | — | — | — | — | — | 1 | 1 | 1 | — | — | — | — | — | — |
| BP-50.+FT | — | — | — | — | — | — | — | — | — | 2 | 2 | 2 | — | — | — |
| TBHP-80 | — | — | — | — | — | — | — | — | — | — | — | — | 2 | 2 | 2 |
| ACU 1 | — | 0.5 | — | — | 0.5 | — | — | 0.5 | — | — | 0.5 | — | — | 0.5 | — |
| AFE 1 | — | — | 0.5 | — | — | 0.5 | — | — | 0.5 | — | — | 0.5 | — | — | 0.5 |
| gel time | 39 | 5.7 | 10 | 7.5 | 5.0 | 5.6 | — | — | 21 | 7.0 | 5.5 | 5.2 | 17.5 | 7.0 | 9.3 |
| hardening time | 49 | 9.3 | 16 | 9.5 | 7.0 | 7.5 | — | — | 34 | 8.7 | 7.8 | 7.0 | 38 | 14.0 | 21 |
| temp. peak | 230 | 230 | 235 | 240 | 240 | 240 | — | — | 225 | 240 | 235 | 237 | 110 | 240 | 203 |
| same formulation as above but with resin type E | | | | | | | | | | | | | | | |
| gel time | — | 10 | — | 30 | 10 | 19 | — | — | — | 15 | 15 | 13 | | | |
| hardening time | — | 19 | — | 35 | 15 | 23 | — | — | — | 18 | 24 | 16 | | | |
| temp. peak | — | 223 | — | 240 | 230 | 230 | — | — | — | 223 | 172 | 210 | | | |

(4) The storage stability of accelerators containing cupric and ferric compounds in polyester resins was also investigated. In each case, 50 g. resin samples, which contained differing amounts of accelerator, were investigated. The gelling of the batches was assessed. The results hereby obtained are summarized in the following Table VII:

TABLE VII

| | | | | | | | | | | |
|---|---|---|---|---|---|---|---|---|---|---|
| resin type A | 100 | 100 | — | — | — | — | — | — | — | — |
| resin type B | — | — | 100 | 100 | — | — | — | — | — | — |
| resin type C | — | — | — | — | 100 | 100 | — | — | — | — |
| resin type D | — | — | — | — | — | — | 100 | 100 | — | — |
| resin type E | — | — | — | — | — | — | — | — | 100 | 100 |
| ACU 1 | 0.5 | 1.0 | 0.5 | 1.0 | 0.5 | 1.0 | 0.5 | 1.0 | — | — |
| ACU 3 | — | — | — | — | — | — | — | — | 0.5 | 1.0 |
| storage time up to gelling in days | 100 | 100 | 100 | 100 | 100 | 100 | 100 | 100 | 22 | 19 |

From the above Table VII, it can be seen that the accelerators according to the present invention possess a high storage stability.

(5) It is possible to prolong the working time of the resin batches by the addition of conventional inhibitors, for example tert.-butylcatechol. The results obtained in the case of these investigations are summarized in the following Table VIII:

TABLE VIII

Prolongation of the gel time of resin batches

| | | | | | | |
|---|---|---|---|---|---|---|
| resin type A | 100 | 100 | 100 | 100 | 100 | 100 |
| MIKP-NA-MI | 2 | 2 | 2 | 2 | 2 | 2 |
| ACU 1 | 1 | 1 | 1 | — | — | — |
| AFE 1 | — | — | — | 1 | 2 | 1 |
| TC 510 | — | 0.1 | 0.5 | — | 0.1 | 0.5 |
| gel time | 3.7 | 13 | 30 | 7.0 | 10.2 | 22 |
| hardening time | 5.8 | 18 | 37 | 19 | 22 | 31 |
| temp. peak | 205 | 202 | 204 | 195 | 193 | 187 |

(6) For comparative purposes, hardening of resin type A was investigated, the ketimine used in Example 1 (acetylacetone cyclohexylimine) being separately mixed with a cobalt accelerator (cobalt octoate or cobalt naphthenate), since the formation of an accelerator is not possible, as can be seen from the above Comparative Example 10.

The results obtained in the case of this investigation are summarized in the following Table IX:

TABLE IX

| | | |
|---|---|---|
| resin type A | 100 | 100 |
| COB 1 | 0.5 | 0.5 |
| ketimine (see | | |

TABLE IX-continued

| Example 1) | — | 0.005 |
| MEKP-HA-1 | 2 | 2 |
| gel time | 6 | 5 |
| hardening time | 12 | 10 |
| temp. peak | 203 | 210 |

A smaller promotor effect can be seen from the above Table IX.

From the above Tables, it can be seen that the accelerators according to the present invention are outstanding for the hardening of the mentioned unsaturated resins, only cause slight discoloration and give very light-stable products which, in the case of subsequent weathering, show no noticeable further changes in their color. It can also be seen that the accelerators of the present invention are considerably superior to the previously known accelerators (see the comparative Examples) in their accelerator action and in their storage stability.

It will be understood that the specification and examples are illustrative but not limitative of the present invention and that other embodiments within the spirit and scope of the invention will suggest themselves to those skilled in the art.

What is claimed is:

1. Accelerator for hardening unsaturated resins, comprising a mixture of at least one ketimine and at least one inorganic or organic cupric or ferric compound.

2. Accelerator as claimed in claim 1 wherein the organic cupric or ferric compound is a salt of a fatty acid containing 6 to 22 carbon atoms or of a naphthenic acid.

3. Accelerator as claimed in claim 2 wherein said compound is at least one member of the group consisting of cupric acetate, cupric naphthenate, ferric chloride and ferric octoate.

4. Accelerator as claimed in claim 1 wherein said ketimine is of the formula

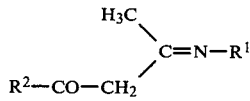

wherein
R$^1$ is a hydrogen atom; a straight-chained or branched alkyl or aralkyl with up to 10 carbon atoms; a cycloalkyl of from 3 to 8 carbon atoms; and
R$^2$ is alkyl or alkoxy with up to 4 carbon atoms; an aryl or aryloxy radical.

5. Accelerator as claimed in claim 4 wherein R$^1$ is a cyclohexyl.

6. Accelerator as claimed in claim 4 wherein R$^2$ is a methyl or ethoxy radical.

7. Accelerator as claimed in claim 1 wherein the mixture is dissolved in an organic solvent.

8. Accelerator as claimed in claim 7 wherein the solvent is an alcohol.

9. Accelerator as claimed in claim 7 wherein the solvent is an aromatic hydrocarbon.

10. Accelerator as claimed in claim 7 wherein the solvent is isopropyl alcohol, xylene or toluene.

11. Accelerator as claimed in claim 1 wherein the content of copper or iron is from 0.1 to 1% by weight.

12. Accelerator as claimed in claim 1 wherein the content of copper or iron is about 0.2% by weight.

13. Method for hardening an unsaturated resin which method comprises adding to such resin an accelerator as claimed in claim 1, together with a hardener for said resin.

14. Method as claimed in claim 13 wherein the hardener used is a ketone peroxide, hydroperoxide or a perester.

15. Method as claimed in claim 13 wherein the hardener used is methyl ethyl ketone peroxide, methyl isobutyl ketone peroxide, acetylacetone peroxide, cyclohexanone peroxide, tert.-butyl hydroperoxide, cumol hydroperoxide, tert.-butyl per-2-ethylhexanonate or tert.-butyl perbenzoate.

16. Method as claimed in claim 13 wherein the accelerator used is 0.001 to 0.02% by weight of metal and 0.005 to 0.5% by weight of ketimine to one part weight-% resin.

17. Method as claimed in claim 13 wherein 0.2 to 2% by weight of accelerator is added.

18. Method as claimed in claim 13 wherein the ketimine is of the formula

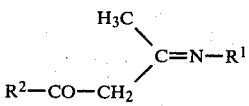

wherein
R$^1$ is a hydrogen atom; a straight-chained or branched alkyl or aralkyl with up to 10 carbon atoms; a cycloalkyl of from 3 to 8 carbon atoms; and
R$^2$ is alkyl or alkoxy with up to 4 carbon atoms; an aryl or aryloxy radical.

19. Method as claimed in claim 13 wherein the organic cupric or ferric compound used is a salt of a fatty acid with 6 to 22 carbon atoms, or of a naphthenic acid.

20. Method as claimed in claim 18 wherein the ketimine used is prepared in situ from a mixture of primary alkylamine and of a beta-diketone.

21. Method as claimed in claim 13 wherein a mixture of a primary amine of the formula $$H_2NR^1$$ 

is used
wherein R$^1$ is a hydrogen atom; a straight-chained or branched alkyl or aralkyl radical with up to 10 carbon atoms or a cycloalkyl radical containing 3 to 8 carbon atoms
with a compound of the formula

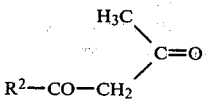

wherein R$^2$ is an alkyl or alkoxy radical with up to 4 carbon atoms or an aryl or aryloxy radical.

* * * * *